United States Patent [19]

Shimp

[11] Patent Number: 4,536,377
[45] Date of Patent: Aug. 20, 1985

[54] PROCESS FOR MAKING SODIUM TRIPOLYPHOSPHATE

[75] Inventor: Lawrence A. Shimp, Robbinsville, N.J.

[73] Assignee: FMC Corporation, Philadelphia, Pa.

[21] Appl. No.: 639,280

[22] Filed: Aug. 8, 1984

Related U.S. Application Data

[63] Continuation-in-part of Ser. No. 376,909, May 10, 1982, abandoned.

[51] Int. Cl.$^3$ ............................................. C01B 25/30
[52] U.S. Cl. .................................................. 423/315
[58] Field of Search ......................................... 423/315

[56] References Cited

FOREIGN PATENT DOCUMENTS 799429   8/1958  United Kingdom ................. 423/315
1089246 11/1967  United Kingdom ................. 423/315

*Primary Examiner*—John Doll
*Assistant Examiner*—Wayne A. Langel
*Attorney, Agent, or Firm*—Charles C. Fellows; Frank Ianno; Eugene G. Seems

[57] ABSTRACT

A one step spray drying process for making high assay sodium tripolyphosphate having a high concentration of form I material by spray drying an aqueous sodium orthophosphate feed liquor having an $Na_2O:P_2O_5$ ratio of 1.60 to 1.70 at a temperature between 250° and 420° C. for up to one minute to produce sodium tripolyphosphate and cooling the product to 150° C. or below in twenty minutes or less.

4 Claims, No Drawings

PROCESS FOR MAKING SODIUM TRIPOLYPHOSPHATE

This application is a continuation-in-part of U.S. Ser. No. 376,909 filed May 10, 1982, abandoned, entitled Process for Making Sodium Tripolyphosphate.

This invention relates to a one-step spray drying process for making high assay sodium tripolyphosphate having a high concentration of form I material. In such processes a dissolved orthophosphate or pyrophosphate is subjected in a single operation to spraying, rapid dehydration and intermolecular condensation to produce a solid sodium tripolyphosphate product.

One-step drying processes for manufacturing sodium tripolyphosphate have been known for some time. U.S. Pat. No. 2,898,189 describes the general one-step spray drying process for making sodium tripolyphosphate. An orthophosphate (or pyrophosphate) liquor is dried to sodium tripolyphosphate in 2–15 seconds in a spray dryer by maintaining an exit gas temperature between 200°–500° C. The sodium tripolyphosphate assay is between 98 and 100%.

There are two different crystalline modifications of sodium tripolyphosphate which are termed phase I and phase II or form I and form II. A process for making sodium tripolyphosphate containing low levels of form II in a spray dryer is described in U.S. Pat. No. 2,977,317. It is necessary in this process that extra moisture in the form of water or steam is added through separate nozzles to the spray dryer along with an orthophosphate feed liquor. The amount of form II is controlled by the water addition, the gas temperature of the dryer being maintained between 200°–450° C.

A process for making substantially pure form II sodium tripolyphosphate in a spray dryer from wet process acid is described in U.S. Pat. No. 3,438,725. This patent discloses that spray dryer conditions that produce pure form II sodium tripolyphosphate from thermal process acid produce form II containing 15–30% form I from wet process acid. The dryer exit gas temperature is always less than 420° C. (the form II to form I transition temperature). This patent discloses that the source of form I in the form II sodium tripolyphosphate made under these temperature conditions is small particles. The small particles lose water quickly in the flame zone of the dryer and get heated above 420° C. The patent focuses on getting these form I particles to revert to form II in the cooler exit gas stream. This occurs when the $SO_4$ and metallic impurities in the wet process acid are kept within certain limits.

South African Patent Application No. 662,765 discloses a process for making high form I sodium tripolyphosphate in a one-step spray dryer process. The process heats the spray dried sodium tripolyphosphate in the dryer to a temperature greater than 420° C. (the form II to form I transition temperature), then cooling the product quickly to 180° C. in under 10 minutes using dry air to prevent reversion of form I to form II.

United Kingdom patent No. 1,089,246 discloses and claims a process for the manufacture of sodium tripolyphosphate containing more than 40%, preferably 60% up to approximately 100%, phase I material (high temperature modification) by subjecting a dissolved orthophosphate in a single operation to spraying, rapid dehydration and intermolecular condensation, sodium orthophosphate containing $P_2O_5$ and $Na_2O$ in the molar ratio of 3:5 being sprayed in a spray tower while allowing off-gases (as hereinbefore defined) to leave the spray tower at a temperature of 400° to 520° C., preferable 420° to 500° C., wherein the sodium tripolyphosphate is cooled within a period of time of less than 10 minutes, preferably less than 4 minutes, from initially 450° C. down to 280° C. and wherein, in the gas phase surrounding the sodium tripolyphosphate, a steam partial pressure value of less than about 300mm. mercury, preferably of less than 100 mm. mercury, is maintained, while the sodium tripolyphosphate is being cooled.

Edwards and Herzog in JACS, 79 (1957) 3674, disclosed that form I sodium tripolyphosphate forms first at temperatures as low as 225° C. Eventually, the form I sodium tripolyphosphate is converted to form II sodium tripolyphosphate. However, pure form I sodium tripolyphosphate is not obtained at temperatures below 420° C. The formation of low temperature form I sodium tripolyphosphate is always accompanied by substantial pyrophosphate formation. The long heating changes the pyrophosphate to sodium tripolyphosphate but the form I sodium tripolyphosphate changes to form II sodium tripolyphosphate at the same time.

Fast dissolving sodium tripolyphosphate is desirable for many applications, especially in the food industry where U.S. Government regulations set standards of high purity and minimum assays of at least 85% sodium tripolyphosphate.

Dissolving properties of sodium tripolyphosphate are controlled by (1) the physical properties of the particles, and (2) the crystal-type distribution (relative proportion of form I and form II sodium tripolyphosphate). Particles with high surface area and low bulk density dissolve fastest. Spray drying is the ideal way to make such particles. However, during dissolution sodium tripolyphosphate, regardless of the particle type, can sometimes cake. Caking slows down or even prevents complete dissolution. Caking is a function of crystal form distribution; high form I containing sodium tripolyphosphate cakes the least and low form I containing sodium tripolyphosphate cakes the most. The fastest dissolving sodium tripolyphosphate is a high form I containing spray dried product.

The theoretical $Na_2O/P_2O_5$ mole ratio for sodium tripolyphosphate (STPP) is 5:3 or 1.667. The $Na_2O/P_2O_5$ ratio for glassy phosphates approaches 1:1; for pyrophosphate (STPP) the ratio is 2:1. Therefore, when there is a ratio of $Na_2O/P_2O_5$ above 1.667 some amount of pyrophosphate is made while when the Na/P ratio is below 1.667 glassy or long chain phosphates are made in small amounts. High assay sodium tripolyphosphate has an assay of 90% or above as sodium tripolyphosphate. The other materials being glassy or pyrophosphate depending upon the ratio of sodium to phosphorus. The ratio limits are 1.60 for 90% sodium tripolyphosphate and 10% glassy phosphates and a ratio of 1.70 for 90% sodium tripolyphosphate containing 10% pyrophosphate. In practice there is never a complete reaction of the starting material so the actual ratio limits are somewhat narrower than those stated here. Some of the long chain phosphates are insoluble in water so that the $Na_2/P_2O_5$ mole ratio is almost never allowed to go below 1.67. The preferred Na/P ratio for high assay spray dried sodium tripolyphosphate is 1.670 to 1.678.

The present invention provides a one-step process for making high assay, that is, 90% or greater, sodium tripolyphosphate having a high concentration of form I material, that is, greater than 75%, by spraying an aqueous sodium orthophosphate liquor having an $Na_2O:P$-

$_2O_5$ ratio of about 5:3 into a spray tower (spray dryer), while allowing the exit gases to leave the spray tower at a temperature between 250°–420° C. for up to one minute thereby producing a product having a maximum temperature below 420° C. and cooling the product to about 150° C. or below in twenty minutes or less.

The feed liquor can be of any concentration provided it is saturated or less than saturated and can contain sodium orthophosphates and/or pyrophosphates with $Na_2O:P_2O_5$ ratio of about 5:3. The 5:3 ratio is theoretical for producing sodium tripolyphosphate. This ratio also expressed as 1:0.667 can vary from 1:0.660 to 1:0.680 and in commercial operations is conveniently controlled in the range of 1:0.670 to 1:0.678. The residence time of the sodium tripolyphosphate in the dryer is one minute or less and the feed liquor is spray dried to produce sodium tripolyphosphate product having a maximum product temperature below 420° C. The product temperature is controlled by controlling the exit gas temperature; the exit gas temperature and the maximum product temperature are substantially the same. The residence time of the sodium tripolyphosphate in the dryer is one minute or less and the sodium tripolyphosphate must be cooled to 150° C. or below in 20 minutes or less. While it is possible to operate the process with the exit gas temperature just below 420° C., say 415° to 418° C. the preferred conditions are to have the spray dryer exit gas and product temperature between 300°–400° C., sodium orthophosphate feed liquor concentration close to saturation and cooling to 150° C. in 15 minutes or less.

The following examples were carried out in a commercial spray dryer having a gas flame source at the top of the dryer at the air intake. The flame temperature may be around 1000° C. which quickly heats the incoming air. The heated air flows about two-thirds of the way down the dryer, exits through a side duct to cyclone separators where sodium tripolyphosphate particles are separated, through a scrubber and then up a stack where the air is forced out by a blower. The sodium tripolyphosphate feed liquor is directed up toward the dryer (gas) flame through a set of spray nozzles. The spray is so directed that it does not go through the flame as this cools the flame, interfers with combustion and causes soot formation. In the hottest part of the dryer, near the flame, water is still evaporating so at that point the product temperature does not exceed the boiling point of water. Due to the evaporation of water the product temperature never exceeds the exit gas temperature during normal dryer operation. The exit gas temperature and the crystalline product temperature are substantially the same. This type dryer is described in U.S. Pat. No. 3,661,514. Sodium tripolyphosphate particles are dried and calcined in the dryer. About half to two-thirds of the sodium tripolyphosphate formed falls to the bottom of the dryer where it is removed by a conveyor to a cooler. The product temperature at the bottom of dryer is substantially the same or slightly lower than the exit gas temperature. The remaining sodium tripolyphosphate leaves the dryer with the exit gases through a duct to the cyclone separators. Sodium tripolyphosphate from the bottom of the dryer is removed by a conveyor to the cooler where it is cooled from about 320° C., when the exit gas temperature is about 378° C., to about 40° C. in 15 minutes. Sodium tripolyphosphate from the dryer enters the cooler about 5–10 minutes after it is made. The sodium tripolyphosphate from the cyclone separators is transported to the cooler 10–25 minutes after entering the cyclone separators. Sodium tripolyphosphate samples were analyzed for assay by standard chromatography techniques using an automatic analyzer. The samples were analyzed for phase I content by standard x-ray diffraction techniques using known samples for comparison.

The following examples further exemplify the process of this invention.

EXAMPLE I

The spray dryer was operated at an exit gas temperature of about 375° C. Sodium orthophosphate feed liquor with a $Na_2O:P_2O_5$ ratio of 1:671–1:676 was used. The time to cool the dryer discharge STPP below 150° C. was less than 10 minutes while the cyclone separated material was cooled in more than 20 minutes. The STPP was screened to less than 10%–100 mesh to remove fine particles. The final screened product contained about 75% dryer discharge STPP and 25% cyclone discharge STPP. (Screening removed more cyclone particles because they are smaller.) The properties of STPP samples collected during the run are shown in Table I, which is attached. All the composite samples were high assay, high form I STPP.

EXAMPLE II

The same test conditions used in Example I were repeated in another test. Samples of STPP were collected from the cyclone discharge and from the dryer discharge. All samples were allowed to cool in the air. The dryer discharge samples cooled from about 320° C. to 150° C. in about 5 minutes. They had been in the dryer for less than 5 minutes. The cyclone samples were held in the dryer exit gases in the cyclones for about 20 minutes, then were collected and cooled to 150° C. in about 5 minutes. All the dryer samples were high phase I STPP while the cyclone samples were low phase I. The results are shown in Table II.

TABLE I

| Properties of Granular Spray Dryed STPP Composite Samples: | | |
|---|---|---|
| Sample | % Phase I Content | % STPP (Assay) |
| 11:00a | 78 | 94 |
| 1:00p | 78 | 94 |
| 11:00p | 78 | 91 |
| 1:00a | 76 | 91 |
| 3:00a | 81 | 92 |
| 5:00a | 70 | 91 |
| 7:00a | 78 | 92 |
| 9:00a | 86 | 93 |
| 5:00p | 82 | 93 |
| 9:00p | 84 | 93 |
| 5:00a | 79 | 92 |

TABLE II

| Properties of Spray Dryed Discharge and Cyclone Discharge STPP: | | |
|---|---|---|
| Sample | % Phase I | % STPP (Assay) |
| 11:30p Dryer | 81 | 93 |
| 11:30p Cyclone | 32 | 94 |
| 12:30a Dryer | 84 | 93 |
| 12:30a Cyclone | 37 | 93 |
| 1:30a Dryer | 82 | 92 |
| 1:30a Cyclone | 46 | 93 |
| 2:30a Dryer | 76 | 90 |
| 2:30a Cyclone | 55 | 93 |

What is claimed is:

1. A one step spray drying process for making high assay, 90% or greater, sodium tripolyphosphate having a high concentration, greater than 75%, of form I material consisting essentially of the steps of spraying an aqueous sodium orthophosphate feed liquor having an $Na_2O:P_2O_5$ ratio of 1.60 to 1.70 into a spray dryer, dehydrating the sprayed feed to a temperature above 250 and below 420° C. in a period of up to one minute to produce sodium tripolyphosphate, removing the product sodium tripolyphosphate, which has a temperature below 420° C., from the dryer and cooling the product to 150° C. or below in twenty minutes or less.

2. The process of claim 1 in which the $Na_2O:P_2O_5$ ratio of the feed liquor is controlled in the range of 1.670 to 1.678.

3. The process of claim 1 in which the spray dryer temperature is maintained between 300 and 400° C.

4. The process of claim 1 in which the product sodium tripolyphosphate is cooled to 150° C. or below in 15 minutes or less.

* * * * *